(12) United States Patent
Frey et al.

(10) Patent No.: US 12,090,787 B2
(45) Date of Patent: Sep. 17, 2024

(54) HYDRAULIC MOTOR FOR A VEHICLE STEERED WHEEL

(71) Applicant: POCLAIN HYDRAULICS INDUSTRIE, Verberie (FR)

(72) Inventors: Adam Frey, Verberie (FR); Stéphane Vidal, Verberie (FR); Nicolas Weber, Verberie (FR); Sylvain Michon, Verberie (FR); Jasraj Singh, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 665 days.

(21) Appl. No.: 17/287,167

(22) PCT Filed: Oct. 17, 2019

(86) PCT No.: PCT/FR2019/052468
§ 371 (c)(1),
(2) Date: Apr. 21, 2021

(87) PCT Pub. No.: WO2020/084228
PCT Pub. Date: Apr. 30, 2020

(65) Prior Publication Data
US 2021/0354511 A1 Nov. 18, 2021

(30) Foreign Application Priority Data

Oct. 23, 2018 (FR) ........................................ 1859780

(51) Int. Cl.
*B60B 35/18* (2006.01)
*B60K 7/00* (2006.01)
*F03C 1/34* (2006.01)

(52) U.S. Cl.
CPC ............. *B60B 35/18* (2013.01); *B60K 7/0015* (2013.01); *F03C 1/0435* (2013.01); *B60K 2007/0038* (2013.01)

(58) Field of Classification Search
CPC ...... B60B 35/18; B60K 7/0015; F03C 1/0435
See application file for complete search history.

(56) References Cited

U.S. PATENT DOCUMENTS 3,199,460 A * 8/1965 Bush ..................... F03C 1/0466
91/487
3,824,899 A * 7/1974 Dzioba ................. F03C 1/0435
180/305

(Continued)

FOREIGN PATENT DOCUMENTS

EP 2295275 A1 3/2011
EP 3012141 A1 4/2016

(Continued)

*Primary Examiner* — Kenneth Bomberg
*Assistant Examiner* — Matthew Wiblin
(74) *Attorney, Agent, or Firm* — The Webb Law Firm

(57) ABSTRACT

An assembly including
a hydraulic device around a second axis of rotation by means of a proximal rolling-element bearing and a distal rolling-element bearing, the hydraulic device including a shaft, a multi-lobe cam, a cylinder block and a distributor,
and a pivoting element adapted to be mounted on an axle, and movable in rotation relative to the hydraulic device around a first axis of rotation.
Views along a plane defined by the second axis of rotation and the first axis of rotation, the proximal rolling-element bearing and the distal rolling-element bearing are positioned on either side of the first axis of rotation, in that the cylinder block is positioned between the first axis of rotation and the proximal rolling-element bearing.

9 Claims, 5 Drawing Sheets

(56) References Cited

U.S. PATENT DOCUMENTS

| | | | |
|---|---|---|---|
| 5,509,497 A * | 4/1996 | Smith | B60K 17/14 |
| | | | 180/308 |
| 5,855,115 A * | 1/1999 | Martin | F03C 1/24 |
| | | | 92/72 |
| 6,302,233 B1 * | 10/2001 | Okamuro | B62D 7/18 |
| | | | 180/308 |
| 6,494,126 B1 * | 12/2002 | Leinonen | F03C 1/0441 |
| | | | 91/496 |
| 2001/0003948 A1 | 6/2001 | Uski | |
| 2011/0017059 A1 * | 1/2011 | Heren | F03C 1/0425 |
| | | | 91/491 |
| 2016/0114670 A1 | 4/2016 | Resch et al. | |
| 2017/0349043 A1 | 12/2017 | Recoura | |

FOREIGN PATENT DOCUMENTS

| | | |
|---|---|---|
| FR | 2693154 A1 | 1/1994 |
| FR | 3030382 A1 | 6/2016 |

* cited by examiner

HYDRAULIC MOTOR FOR A VEHICLE STEERED WHEEL

CROSS-REFERENCE TO RELATED APPLICATIONS

This application is the United States national phase of International Application No. PCT/FR2019/052468 filed Oct. 17, 2019, and claims priority to French Patent Application No. 1859780 filed Oct. 23, 2018, the disclosures of which are hereby incorporated by reference in their entirety.

BACKGROUND OF THE INVENTION

Field of the Invention

The present invention relates to hydraulic machines, and more precisely to an improved hydraulic machines structure.

Description of Related Art

Hydraulic machines, and in particular hydraulic motors employed for driving the steerable wheels of a vehicle, must satisfy several specific constraints relating to compactness, and must be able to be associated with means for fastening a wheel.

Thus hydraulic motors are known as presented in document FR 2693154, which presents a hydraulic motor driving a steerable vehicle wheel. The motor as presented is mounted in rotation by means of rolling-element positioned in an O assembly between the wheel spindle and the hydraulic motor. The elements forming the hydraulic motor are positioned between the pivoting axis and the rolling-element bearings. An architecture of this type can be problematic for applications in which the wheel spindle must be very close to the steering pivot.

Also known are architectures in which the rolling-element bearings are positioned on either side of the hydraulic motor, and on either side of the steering pivot. The cylinder block is then mounted on the side opposite to the wheel spindle relative to the pivoting axis, and a spacer is interleaved between the cylinder block and the adjacent rolling-element bearing. Although allowing the creation of a structure with a short shaft, an architecture of this type is, however, constraining with regard to bulk at the pivot support, thus requiring an increase in the length of the steering pivot, which can be penalizing for certain applications.

It is also desired to reconcile the requirements regarding bulk, the possibility of fastening a wheel, and taking up forces for a wheel motor of this type.

SUMMARY OF THE INVENTION

The present invention thus aims to respond at least partially to these problems.

The present disclosure relates to an assembly comprising a hydraulic device comprising a rotor and a stator, the rotor being mounted in rotation relative to the stator around a second axis of rotation by means of a proximal rolling-element bearing and a distal rolling-element bearing, the hydraulic device comprising a shaft, a multi-lobe cam, a cylinder block having a plurality of receptacles each equipped with a piston mounted sliding relative to the multi-lobe cam, and a distributor comprising a core and a distribution casing,
a pivoting element adapted to be mounted on an axle, and movable in rotation relative to the hydraulic device around a first axis of rotation, the stator being mounted in rotation relative to the axle around the first axis of rotation, the rotor comprising the shaft having a proximal end equipped with means allowing the mounting of a vehicle wheel, and an opposite distal end,
the cylinder block is positioned between the first axis of rotation and the proximal rolling-element bearing in the direction defined by the second axis of rotation, and in that
viewed in projection along a plane defined by the second axis of rotation and parallel to the first axis of rotation, the proximal rolling-element bearing and the distal rolling-element bearing are positioned at least partially on either side of the first axis of rotation.

According to one example, the distributor, or more precisely the core of the distributor, is positioned between the cylinder block and the distal rolling-element bearing along the second axis of rotation.

According to one example, the projections of the pivoting element and of the distal rolling-element bearing, viewed along a plane defined by the second axis of rotation and parallel to the first axis of rotation, are at least partially superimposed.

According to one example, the pivoting element comprises a plurality of hydraulic pipes provided within it, so as to allow hydraulic fluid supply to the distributor.

According to one example, the proximal rolling-element bearing and the distal rolling-element bearing are arranged in a O assembly.

The cylinder block is then typically configured so as to exert a force tending to move the shaft from its distal end to its proximal end, and in which the distal rolling-element bearing comprises an internal ring and an external ring between which are positioned a plurality of frustoconical rollers, the external ring of the distal rolling-element bearing being mounted supported against a casing segment so as to oppose said movement of the shaft.

As a variant, the proximal rolling-element bearing and the distal rolling-element bearing are arranged in an X assembly.

The proximal rolling-element bearing then typically comprises an internal ring and an external ring between which are positioned a plurality of the frustoconical rollers and wherein the cylinder block is configured so as to exert a force tending to move the internal ring of the proximal rolling-element bearing in a direction extending from the distal end to the proximal end of the shaft, the external ring of the proximal rolling-element bearing being mounted supported against a casing segment, so as to oppose said movement.

The present disclosure also relates to a vehicle comprising an axle and having two steerable wheels, said two steerable wheels each being mounted on an assembly integral with the axle as previously defined.

BRIEF DESCRIPTION OF THE DRAWINGS

The invention and its advantages will be better understood upon reading the detailed description made hereafter of different embodiments of the invention, given by way of non-limiting examples. This description makes reference to the pages of appended drawings, in which.

In all the figures, similar elements are designated by identical numerical references.

DETAILED DESCRIPTION OF EXEMPLARY EMBODIMENTS

Figure 1:
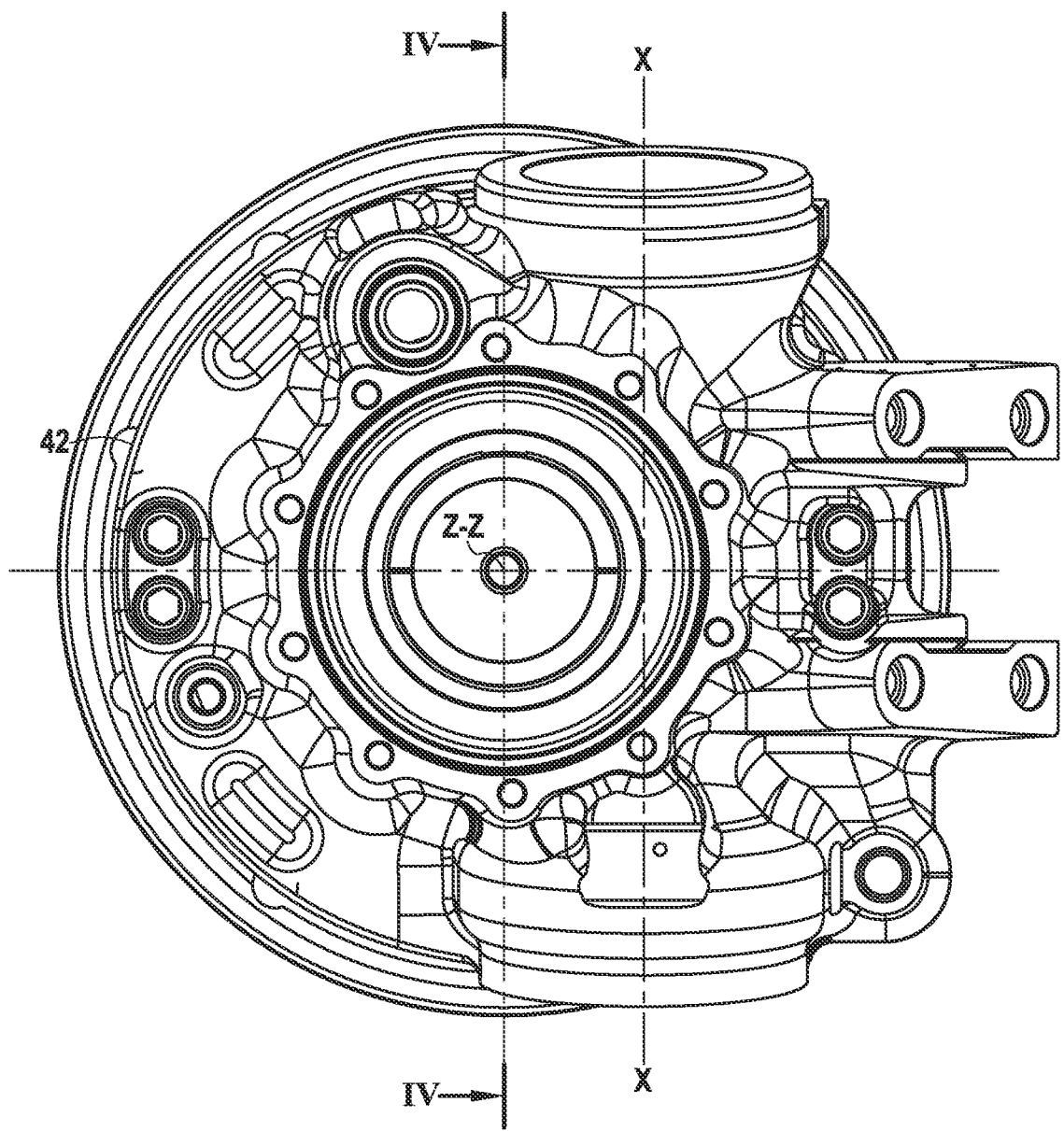
FIGS. 1 and 2 show an example of an assembly according to one aspect of the invention.
Figure 2:
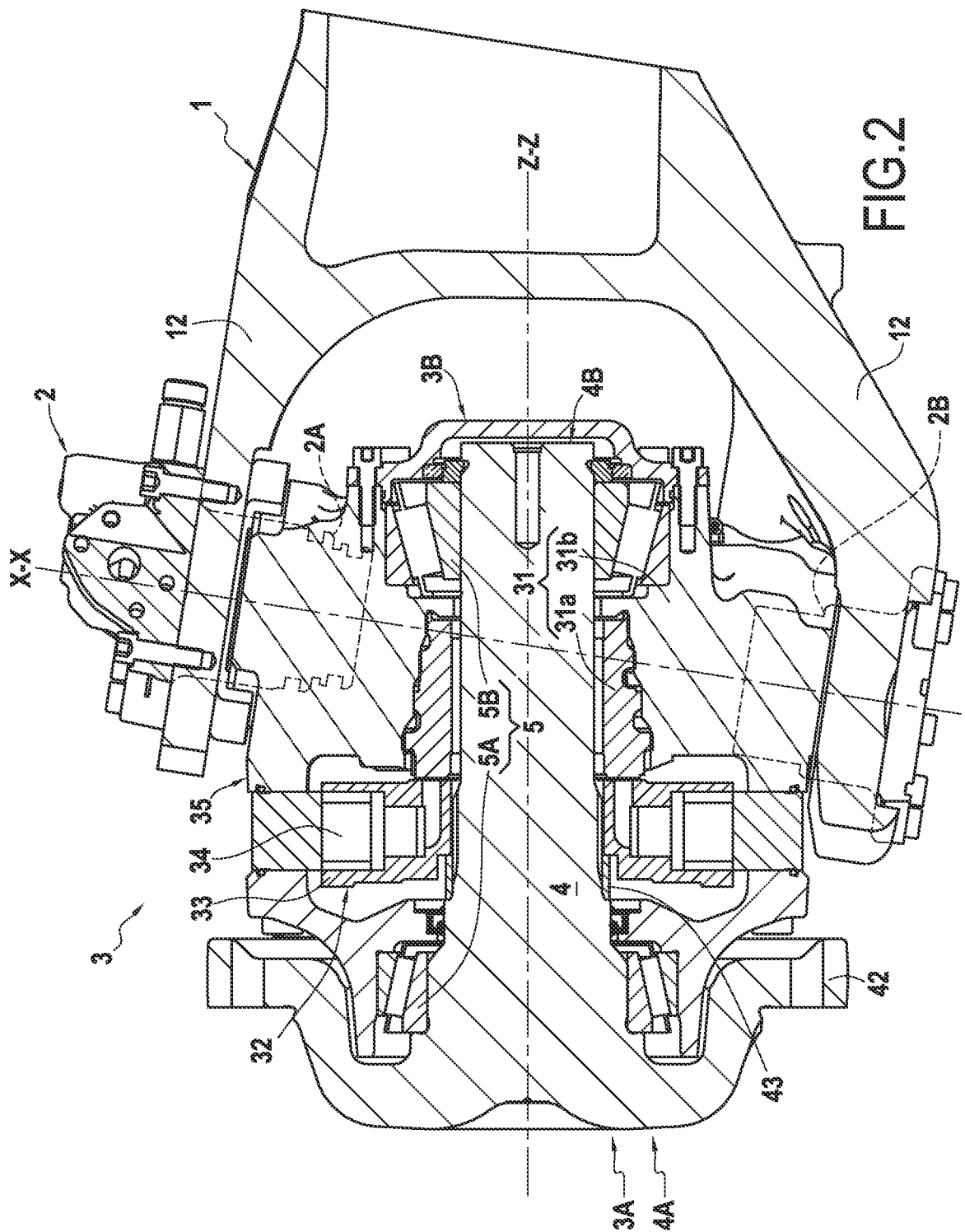

Described hereafter is a first embodiment of the invention with reference to FIGS. 1 and 2.

Shown in these figures is a system comprising a hydraulic device 3 coupled to an axle 1 by means of a pivot 2. The hydraulic device 3 is mounted movably relative to the axle 1 along a first axis of rotation X-X by means of the pivot 2. The axle 1 typically comprises two arms 12 generally defining a C shape and forming a support for the pivot 2.

The hydraulic device 3 is for example a hydraulic device with radial pistons and a multi-lobe cam. By way of a variant, the hydraulic device can be an axial piston device, a vane device, an internal or external gear device.

It thus comprises a distributor 31 formed from a core 31a surrounded by a distribution casing 31b, a cylinder block 32 comprising a plurality of cylinders extending radially relative to a second axis of rotation Z-Z and in which pistons 33 slide, and a multi-lobe cam 34 positioned facing pistons 33. The hydraulic device 3 also comprises a shaft 4 and a casing 35, the sections of which can be formed in particular by the cam 34 and by the distribution casing 31b.

Defined for the hydraulic device 3 is a set of fixed elements or stator, and a set of rotating elements or rotor. In the example illustrated, the rotor comprises the shaft 4 and the cylinder block 32, while the stator comprises the cam 34, the casing 35 and the distributor 31.

The link between the rotor and the stator is accomplished via a bearing 5 comprising here two rolling-element bearings 5A and 5B, here conical rolling-element bearings positioned in an O assembly.

For example, the rolling-element bearing 5A is a grease-lubricated rolling-element bearing and the rolling-element bearing 5B is a rolling-element bearing lubricated with oil, in particular the oil of the hydraulic device 3. As a variant, both rolling-element bearings 5A and B are lubricated with oil, and particularly the oil of the hydraulic device 3.

As can be seen in particular in FIG. 1, the first axis of rotation X-X and the second axis of rotation Z-Z are not in the same plane. More precisely, if one considers a plane P defined by the second axis of rotation Z-Z and parallel to the first axis of rotation X-X, the first axis of rotation X-X is then out of this plane P, typically offset by a non-zero distance in a direction perpendicular to the plane P. The plane P corresponds to the plane of FIGS. 2, 4 and 5.

This configuration allows improving the compactness of the assembly, as will be detailed hereafter.

The hydraulic device 3 typically comprises means configured to allow carrying a rim and a vehicle wheel tire. In the example shown, the shaft 4 of the hydraulic device 3 forms a wheel spindle, having a proximal end 4A equipped with a portion extending radially and forming a support zone for the fastening of a rim (not shown). In the example illustrated, the shaft 4 thus forms a wheel spindle comprising a hub 42 at its proximal end 4A for the fastening of a rim, the opposite end of the shaft 4 forming here a distal end 4B. Thus a proximal end 3A of the hydraulic device 3, and a distal end 3B of the hydraulic device 3, are generally defined. In the example illustrated, the proximal end 3A of the hydraulic device 3 corresponds to the proximal end 4A of the shaft 4, while the distal end 3B corresponds to a cover capping the distal end 4B of the shaft 4.

In the example shown, the pivot 2 connects the distribution casing 31b (also called the distribution cover) to the axle 1 via two pivoting links 2A and 2B aligned along the axis X-X on either side of the hydraulic device 3. For manufacturing reasons, the pivoting link is accomplished between the distribution casing 31b and a pivoting element 2 integral with the axle 1, this pivoting element also being producible with narrower manufacturing tolerances than the axle 1.

One of the pivoting links, in this case the upper pivoting link 2A in the embodiment shown in FIGS. 1 and 2, typically comprises pipes forming supply, exhaust and hydraulic drain lines for the hydraulic device 3, produced directly in the pivot and connected to the distributor 31 of the hydraulic device 3.

The other of the pivoting links 2B, here the lower pivoting link, can in particular comprise means for the formation of pneumatic ducts and/or for measuring the rotation of the pivot 2, for example a rotation sensor within the pivot, as described hereafter.

As a variant, the upper pivoting link 2A can comprise means for the formation of pneumatic ducts and/or for measuring the rotation of the pivot 2, for example a rotation sensor, and the lower pivoting link 2B comprises pipes forming hydraulic supply lines for the hydraulic device 3, the operation remaining unchanged.

The pivoting link considered allows relative rotation of the hydraulic device 3 and the axle 1 around the first axis of rotation X-X.

Hereafter, the two rolling-element bearings 5A and 5B will be designated as being the proximal rolling-element bearing 5A and the distal rolling-element bearing 5B, each being closest to the end with the same name.

The proximal rolling-element bearing 5A and the distal rolling-element bearing 5B are positioned on either side of the cylinder block 32 and of the distributor 31 of the hydraulic device 3, and are arranged in an O assembly as already described previously.

In the example illustrated, the proximal rolling-element bearing 5A is interleaved between a portion of the casing 35 and the shaft 4, while the distal rolling-element bearing 5B is interleaved between the shaft 4 and the distribution casing 31b. Conventionally, each rolling-element bearing 5A and 5B comprises an internal ring and an external ring between which are positioned a plurality of frustoconical rollers.

For the mounting of the proximal rolling-element bearing 5A, the internal ring is mounted supported against a shoulder, formed here by the shaft 4, forming an abutment in a direction extending from the distal end 3B to the proximal end 3A. The external ring is mounted against a shoulder formed by a segment of the casing 35, forming an abutment in a direction extending from the proximal end 3A to the distal end 3B.

For the mounting of the distal rolling-element bearing 5B, the internal ring is mounted supported against a shoulder, formed here by a nut or by an adjustable shim mounted on the shaft 4, forming an abutment in a direction extending from the proximal end 3A to the distal end 3B. The external ring is mounted against a shoulder formed by a segment of the casing 35, forming an abutment in a direction extending from the distal end 3B to the proximal end 3A.

Viewed in projection along the plane P defined by the second axis of rotation Z-Z and parallel to the first axis of rotation X-X, the proximal rolling-element bearing 5A and the distal rolling-element bearing 5B are positioned at least partially on either side of the projection of the first axis of rotation X-X. The cylinder block 32 is positioned between the first axis of rotation X-X and the proximal rolling-element bearing 5A. A configuration of this type has several advantages.

This configuration allows reconciling a reduced bulk at the distal portion 3b of the hydraulic device 3, while allowing proposing a shaft 4 that is qualified as short, i.e. with a reduced distance between the first axis of rotation X-X and the proximal end 4A of the shaft carrying the means configured to allow carrying a rim and a vehicle wheel tire, without necessitating increasing the bulk of the hydraulic device 3 along the first axis of rotation X-X.

The bulk at the distal end 3B (which forms what is qualified as the back, by opposition to the proximal end 3A adapted to carry a tire and which forms the front of the wheel motor) is reduced, which allows simplifying the design of the axle 1 and particularly of the arms 12 of the axle 1 forming a support for the pivot 2, and also simplifying the possible integration of the pipes at the back of the motor, for example pneumatic or hydraulic supply pipes if the latter are not directly produced within the pivot 2.

The proximal rolling-element bearing 5A is typically isolated from the internal volume of the hydraulic device 3 (i.e. from the volume delimited by the casing 35 in which is positioned in particular the cylinder block 32) and from the external environment by dynamic sealing means.

In the example illustrated, the cylinder block 32 is mounted supported against an axial abutment formed on the shaft 4 by means of a shim 43. The cylinder block 32 is subjected to a thrust force exerted by the distributor 31 (in this case the core 31a of the distributor 31) resulting from the pressurization of the different pipes of the distributor 31. This force is transmitted by the cylinder block 32 to the shaft 4 via the shim 43 tending to move it in a direction defined by the second axis of rotation Z-Z, from the distal end 4B to the proximal end 4A.

This force is then taken up by the distal rolling-element bearing 5B, the 0 assembly of the rolling-element bearings 5A and 58 allowing the axial load to be supported.

The distributor 31 as shown extends on either side of the first axis of rotation X-X, viewed along a plane defined by the second axis of rotation Z-Z and the first axis of rotation X-X, and is typically configured so as to extend essentially in the direction of the proximal end 3A of the hydraulic device 3, which results in particular from the position of the cylinder block 32 which is positioned between the distributor 31 and the proximal rolling-element bearing 5A. The fluid supply is accomplished directly here through an element of the pivot 2 accomplishing fluid supply to the pipes provided in the distribution casing 31b as already indicated previously.

Figure 3:
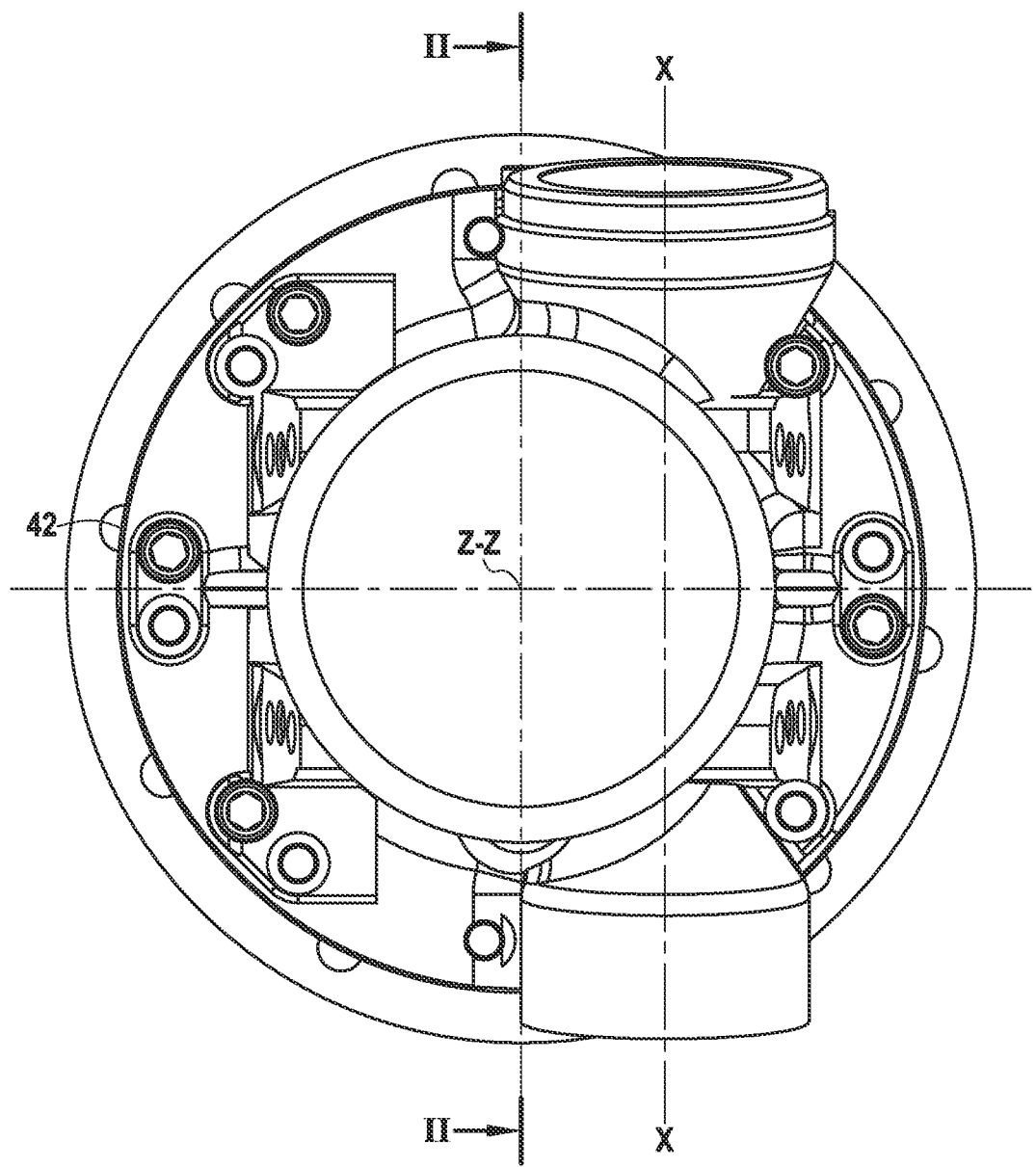
FIGS. 3 and 4 show two views of another example of an assembly according to one aspect of the invention.
Figure 4:
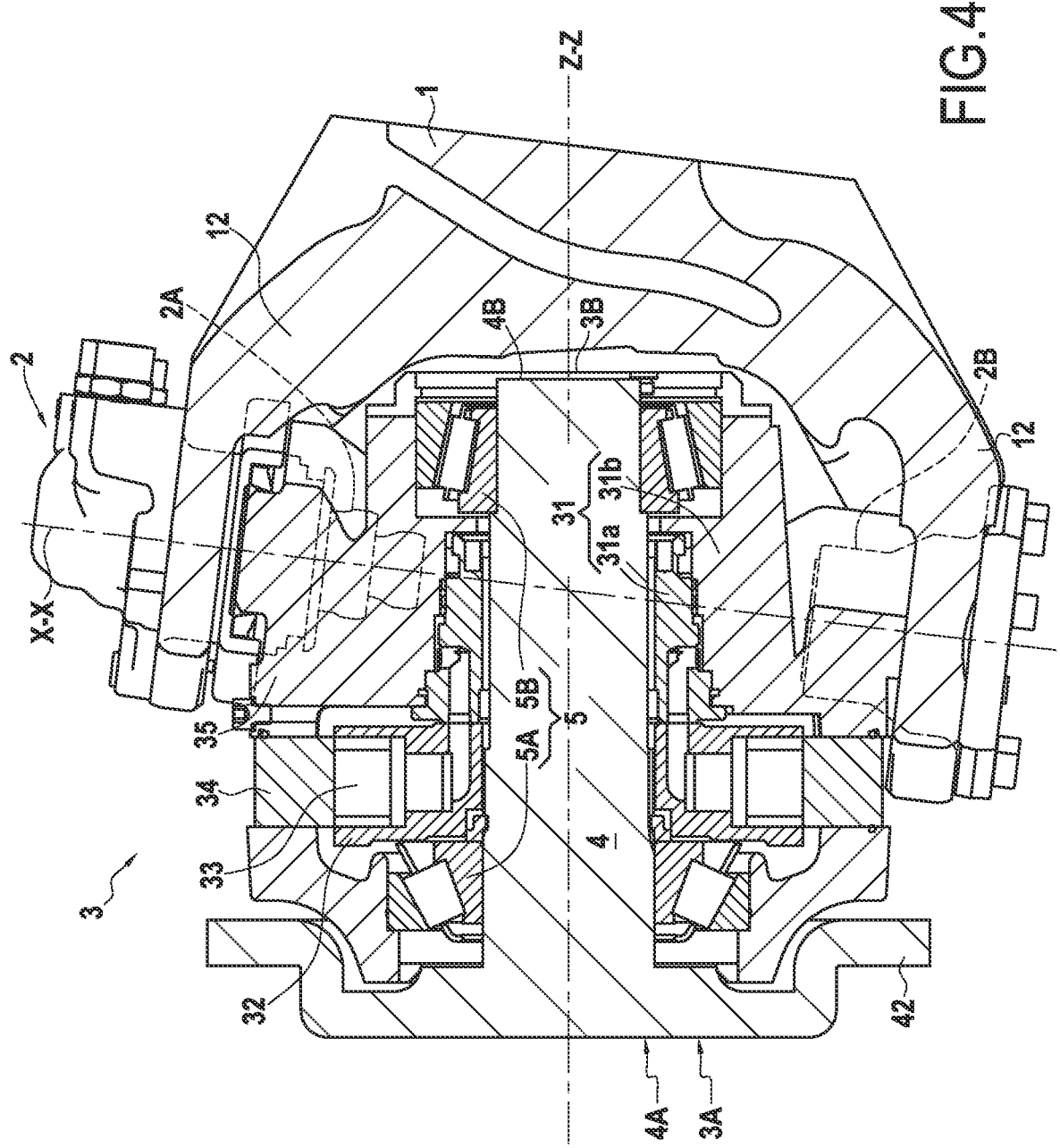

FIGS. 3 and 4 show another embodiment of an assembly according to the invention.

Found in this embodiment are several elements already described with reference to FIG. 1. Described hereafter are only the distinctive elements of this embodiment relative to the embodiment already described with reference to FIG. 1.

In this embodiment, the two rolling-element bearing elements 5A and 5B are arranged in an X assembly.

In this embodiment, for mounting the proximal rolling-element bearing 5A, the internal ring is mounted supported against a ring supported on the shaft 4, forming an abutment in a direction extending from the proximal end 3A to the distal end 3B. The external ring is mounted against a shoulder formed by a segment of the casing 35, forming an abutment in a direction extending from the distal end 3B to the proximal end 3A.

For mounting the distal rolling-element bearing 5B, the internal ring is mounted supported against a shoulder, formed here by the shaft 4, forming an abutment in a direction extending from the proximal end 3A to the distal end 3B. The external ring is mounted against a shoulder formed by a segment of the casing 35, forming an abutment in a direction extending from the proximal end 3A to the distal end 3B.

In this embodiment, the cylinder block 32 is mounted supported against the internal ring of the proximal rolling-element bearing 5A. The cylinder block 32 is subjected to a thrust force along the second axis of rotation Z-Z in a direction extending from the distal end 3B to the proximal end 3A exerted by the distributor 31 (in this case, the core 31a of the distributor 31) resulting from the pressurization of the different pipes of the distributor 31. This force is transmitted by the cylinder block 32 to the proximal rolling-element bearing 5A, which will take up this force due to the X assembly of the rolling-element bearings 5A and 58; the proximal rolling-element bearing 5A will also take up this force. In fact, the force tends to move the internal ring of the proximal rolling-element bearing 5A (and therefore the shaft 4 against which it is supported) in this direction extending from the distal end 3B to the proximal end 3A. The external ring of the proximal rolling-element bearing 5A mounted supported against the casing 35 segment opposes this movement.

The operation remains unchanged relative to the embodiment already described with reference to FIG. 1.

As already described with reference to the embodiment seen in FIGS. 1 and 2, the first axis of rotation X-X and the second axis of rotation Z-Z are not in the same plane. This offset is visible in particular in FIG. 3.

Just like the embodiment already described with reference to FIG. 1, this embodiment allows reconciling a reduced bulk at the distal portion 3B of the hydraulic device 3, while allowing proposing a shaft 4 that is qualified as short, i.e. with a reduced distance between the first axis of rotation X-X and the proximal end 4A of the shaft carrying the means configured to allow carrying a rim and a vehicle wheel tire, without necessitating increasing the bulk of the hydraulic device 3 along the first axis of rotation X-X.

Figure 5:
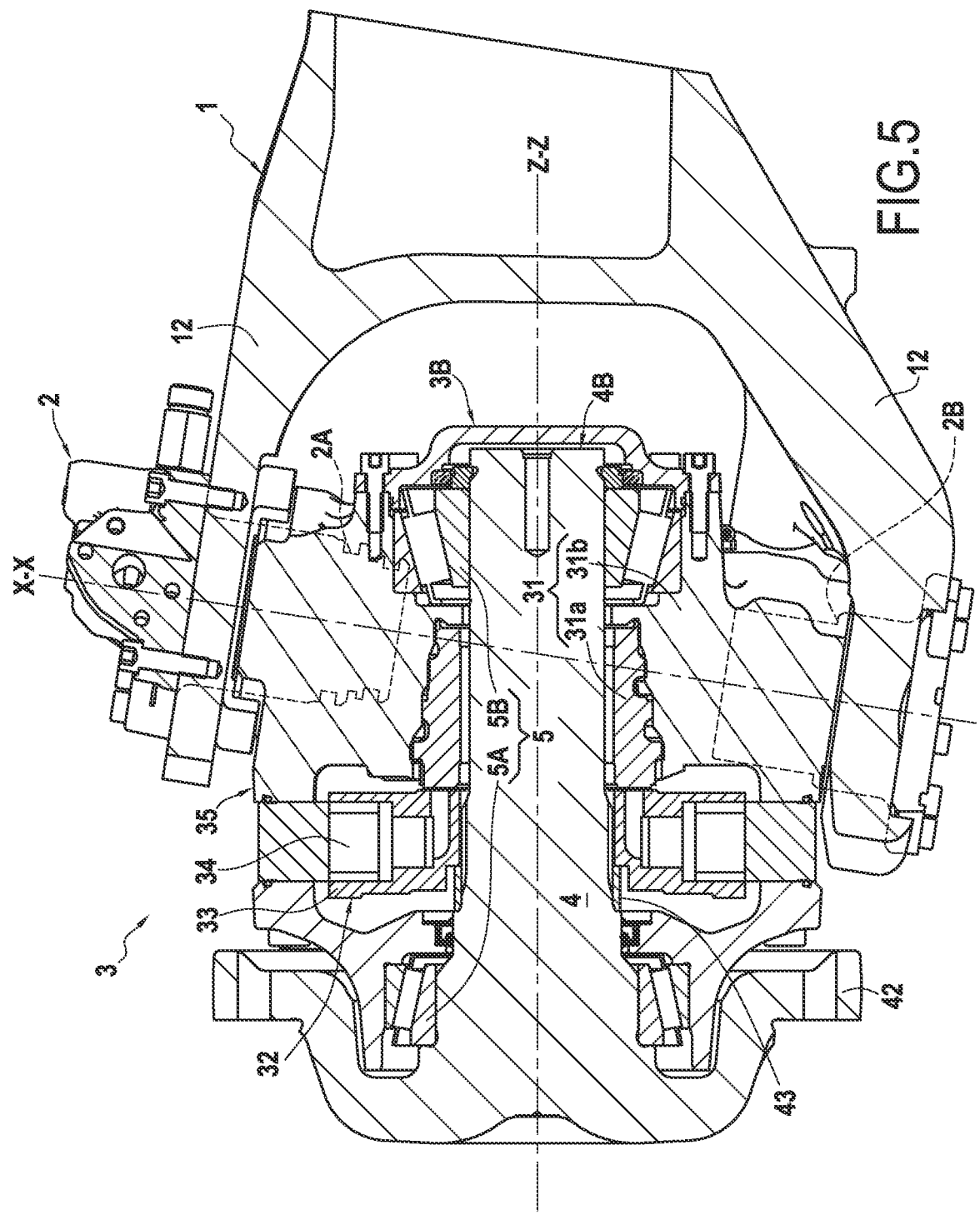
FIG. 5 shows a variant of the example shown in FIG. 2.

FIG. 5 shows a variant of the embodiment shown in FIG. 2, described previously.

In this embodiment, the element 2A of the pivoting link 2 has a substantially greater dimension than the element 2A of the pivoting link 2 shown previously with reference to FIG. 4.

As can be seen in this figure, viewed in projection along the plane P defined by the second axis of revolution Z-Z and parallel to the first axis of revolution X-X, the distal rolling-element bearing 5B and the element 2A of the pivot 2 are superimposed at least partially. The projection of the element 2A of the pivot 2 in the plane P mentioned previously is visible in dotted lines.

A superimposition of this type is made possible by the fact that the first axis of rotation X-X and the second axis of rotation Z-Z are not in the same plane, as already described previously and visible for example in FIG. 3.

A configuration of this type allows increasing the compactness of the system, and/or offering more available volume for the pivot 2, which can in particular be advantageous when the hydraulic or pneumatic pipes are provided directly in the pivot 2.

A configuration of this type with superimposition in the plane P of the projection of the distal rolling-element bearing 5B and at least one element of the pivot 2 can also be accomplished with rolling-element bearings forming an X assembly as already presented with reference to FIGS. 3 and 4.

Although the present invention has been described with reference to specific exemplary embodiments, it is obvious that modifications and changes can be carried out on these examples with departing from the general scope of the invention as defined by the claims. In particular, individual features of the different embodiments illustrated/mentioned can be combined into additional embodiments. Consequently, the description and the drawings must be considered in an illustrative, rather than a restrictive sense.

It is also obvious that all the features described with reference to a method are transposable, alone or in combination, to a device, and conversely, all the features described with reference to a device are transposable, alone or in combination, to a method.

The invention claimed is:

1. An assembly comprising
   a hydraulic device comprising a rotor and a stator, the rotor being mounted in rotation relative to the stator around a second axis of rotation by means of a proximal rolling-element bearing and a distal rolling-element bearing, the hydraulic device comprising a shaft, a multi-lobe cam, a cylinder block having a plurality of receptacles each equipped with a piston mounted sliding relative to the multi-lobe cam, and a distributor comprising a core and a distribution casing, and
   a pivoting element adapted to be mounted on an axle, and movable in rotation relative to the hydraulic device around a first axis of rotation, the stator being mounted in rotation relative to the axle around the first axis of rotation,
   the rotor comprising the shaft having a proximal end equipped with means allowing the mounting of a vehicle wheel, and an opposite distal end,
   wherein the cylinder block is positioned between the first axis of rotation and the proximal rolling-element bearing in a direction defined by the second axis of rotation, and
   wherein when viewed in projection upon a plane defined by the second axis of rotation and parallel to the first axis of rotation, the proximal rolling-element bearing and the distal rolling-element bearing are positioned at least partially on either side of the first axis of rotation.

2. The assembly according to claim 1, wherein the core of the distributor is positioned between the cylinder block and the distal rolling-element bearing along the second axis of rotation.

3. The assembly according to claim 1, wherein when viewed in projection upon the plane defined by the second axis of rotation and parallel to the first axis rotation, the pivoting element and the distal rolling-element bearing viewed upon the plane are at least partially superimposed.

4. The assembly according to claim 1, wherein the pivoting element comprises a plurality of hydraulic pipes provided within it, so as to allow hydraulic fluid supply to the distributor.

5. The assembly according to claim 1, wherein the proximal rolling-element bearing and the distal rolling element bearing are arranged in an O assembly.

6. The assembly according to claim 5, wherein the cylinder block is configured so as to exert a force tending to move the shaft from its distal end to its proximal end, and wherein the distal end comprises an internal ring and an external ring between which are positioned a plurality of frustoconical rollers, the external ring of the distal rolling-element bearing being mounted supported against a casing segment, so as to oppose said movement of the shaft.

7. The assembly according to claim 1, wherein the proximal rolling-element bearing and the distal rolling-element bearing are arranged in an X assembly.

8. The assembly according to claim 7, wherein the proximal rolling-element bearing comprises an internal ring and an external ring between which are positioned a plurality of frustoconical rollers and wherein the cylinder block is configured so as to exert a force tending to move the internal ring of the proximal rolling-element bearing in a direction extending from the distal end to the proximal end of the shaft, the external ring of the proximal rolling-element bearing being mounted supported against a casing segment, so as to oppose said movement.

9. A vehicle comprising an axle and having at least one steerable wheel, said at least one steerable wheel being mounted on an assembly according to claim 1 integral with the axle.

* * * * *